United States Patent
Heerten et al.

(10) Patent No.: US 7,740,042 B2
(45) Date of Patent: *Jun. 22, 2010

(54) APPARATUS FOR VIBRATION WELDING OF SHEET MATERIALS

(75) Inventors: Georg Heerten, Lubbecke (DE); Volkhard Muller, Petershagen (DE); Stephan Priewich, Labbecke (DE); Werner Uehlemann, Espelkamp (DE)

(73) Assignee: Naue GmbH & Co. KG, Espelkamp-Fiestel (DE)

( * ) Notice: Subject to any disclaimer, the term of this patent is extended or adjusted under 35 U.S.C. 154(b) by 446 days.

This patent is subject to a terminal disclaimer.

(21) Appl. No.: 11/654,767

(22) Filed: Jan. 17, 2007

(65) Prior Publication Data

US 2007/0113982 A1    May 24, 2007

Related U.S. Application Data

(63) Continuation of application No. 10/443,264, filed on May 22, 2003, now abandoned, which is a continuation of application No. 09/535,621, filed on Mar. 27, 2000, now Pat. No. 6,572,718.

(30) Foreign Application Priority Data

Mar. 25, 1999   (DE)   ............................... 199 13 479

(51) Int. Cl.
   *B32B 37/00*   (2006.01)

(52) U.S. Cl. .................. 156/580; 156/73.5; 405/302.6; 405/302.7

(58) Field of Classification Search .................. 156/64, 156/73.1, 73.5, 73.6, 242, 244.11, 250; 405/302.4, 405/203.6, 302.7, 258.1, 15, 302.6
   See application file for complete search history.

(56) References Cited

U.S. PATENT DOCUMENTS 3,733,238 A * 5/1973 Long et al. ................ 156/580.1
4,086,122 A * 4/1978 Bouyoucos et al. ......... 156/556
6,572,718 B2 * 6/2003 Heerten et al. ............. 156/73.6

* cited by examiner

*Primary Examiner*—James Sells
(74) *Attorney, Agent, or Firm*—Horst M. Kasper

(57) ABSTRACT

The invention provides large surface area geogrids with a high tensile strength, a method and apparatus for producing them, and their use as drain and reinforcement grids and as fences. The method for the continuous production of geogrids which have a large surface area and comprise thermoplastic bars which cross one another and are joined together by welding at the areas where they cross one another is characterized in that single-layer, homogeneous, molecular-oriented plastic bars with a high tensile strength are used and a multiplicity of crossing areas arranged behind one another and next to one another are intermittently welded simultaneously using the vibration-welding technique. In this method, a newly developed vibration-welding apparatus is used, which is characterized in that it has at least one vibration device which can be used to weld at least 100 crossing areas, preferably up to 500 crossing areas, simultaneously.

10 Claims, No Drawings

APPARATUS FOR VIBRATION WELDING OF SHEET MATERIALS

REFERENCE TO RELATED APPLICATIONS

This application is a continuation application of application Ser. No. 10/443,264 filed May 22, 2003, now abandoned, which is a continuation application of Ser. No. 09/535,621 filed Mar. 27, 2000, now U.S. Pat. No. 6,572,718.

The present invention relates to large surface area geogrids with a high tensile strength, a method and apparatus for producing them, and their use as drain and reinforcement grids.

Geogrids of this nature are used, for example, to secure road and rail structures, to secure earth, to stabilize slopes and to secure landfill sealing systems.

The so-called Tensar® geogrids produced by Netlon have been in use throughout the world in a very wide range of application areas since as early as the late 1970s.

To produce geogrids of this nature, extruded polyethylene or polypropylene webs are perforated at regular intervals. While being heated, the webs are stretched either in the longitudinal direction (uniaxially) as described in British Patent 2,073,090 or in the longitudinal and transverse directions (biaxially) as described in British Patent 2,035,191. The stretching brings the polymer molecules of a randomly arranged layer into an ordered and aligned position in the direction of stretching. This method increases the tensile strength and the rigidity of the geogrids. A further development to these geogrids is described in U.S. Pat No. 4,618,385 (Mercer). However, these geogrids have the problem that the grid points cannot be stretched uniformly in the same way as the webs running between the grid points, so that with grids which have been stretched in this way the strength with respect to the weight per square metre is to a certain extent unsatisfactory.

In order to improve the ratio of strength to weight per square metre, DE-C 41 37 10 (Akzo) has described a method for producing geogrids in which firstly strips comprising two layers of polymers which have different melting ranges are produced and then stretched (molecular-oriented bicomponent strips). Then, the strips are laid crosswise in rows, in such a manner that the side of the strips which has the lower melting range rests against another such side. The resultant structure is then exposed to a temperature which is above the melting range of the polymer with the lower melting range but below the melting range of the polymer with the higher melting range. As a result, the intersections of the strips of adjacent rows are joined together via the polymer with the low melting range.

British Patent Application 2,314,802 (Mercer) is based on a similar method. In this document, the introduction to the description states, with regard to the prior art, that the Signode company produces geogrids made from molecular-oriented polyester ribbons which are coated on one side with a plastic which has a lower melting point (bicomponent ribbons). These bicomponent polyester ribbons are then placed crosswise on top of one another in such a way that those sides which have a low melting point bear against one another in the crossing areas. Then, the crossing areas are welded.

The drawback of these geogrids is that the strength of the join in the crossing areas, which is predetermined by the lower-melting polymer component, is unsatisfactory.

To eliminate this drawback, the above mentioned British Patent Application 2,314,802 (applied for on 2 Jul. 1996 and published on 14 Jan. 1998) has developed a method in which molecular-oriented bicomponent strips are also used, but with the modification that one bottom bicomponent strip and one top bicomponent strip per grid web are positioned in the direction of the machine, specifically in such a way that those sides of the two strips which have the lower melting point rest on top of one another over their entire surfaces after the transverse strips have been introduced. Then, in each case the bottom bicomponent strips, with the inclusion of the transverse strips, are joined to the top bicomponent strips over their entire surfaces by means of flame welding or hot-air welding.

Although this method does increase the strength of the join in the crossing area, it has the drawback that, considered from a materials perspective, two different polymers are required in order to produce the bicomponent strips and in each case two bicomponent strips are required to form the corresponding web component.

Therefore, the object of the present invention is to provide a large surface area geogrid which has a high tensile strength and is produced by welding from single-layer, homogeneous, molecular-oriented bars which have a high tensile strength and do not have any additional coatings, in such a way that, on the one hand, a satisfactory bonding strength is achieved in the welded crossing areas of the plastic bars, but without significantly impairing the molecular orientation, i.e. the tensile strength of the plastic bars in the crossing areas, and, on the other hand, it is possible to ensure an economic production rate.

This object is achieved by using single-layer, homogeneous, molecular-oriented plastic bars with a high tensile strength and by using the vibration-welding technique, with a multiplicity of crossing areas, which are arranged next to and behind one another, of the single-layer, homogeneous, molecular-oriented plastic bars which have a high tensile strength and cross one another being intermittently joined together simultaneously under identical conditions and under pressure.

The vibration-welding technique comprises a friction-welding process, in which the crossing areas of the plastic bars resting on top of one another are plasticized not by the external supply of heat, but rather by the direct conversion of frictional energy into heat. For this purpose, the plastic bars, at their crossing areas, are made to vibrate with frequencies and amplitudes which are such that the surfaces soften and, in this way, are welded together under high pressure. Therefore, the principal feature of vibration welding is the reciprocating movement in order to generate the friction, so that the heat of fusion only acts on the surfaces of the bars and the molecular orientation is only lost on the surface of the plastic bars. Moreover, this method has the advantage of short heating and cooling times, since heating takes place only at the surfaces, so that short cycle times are possible, enabling the desired economic production rate to be achieved, i.e. the large surface area geogrids according to the invention can be produced with an overall width of, for example, 5 m and a distance between the plastic ribbons, from ribbon centre to ribbon centre, of approx. 3 cm, at a rate of at least 2.5 m per minute.

Originally, this was not considered possible, since it was assumed that, given an expected surface pressure of approx. 1.5 N/mm$^2$ and a width of the plastic rods of, for example, 12 mm with a 3 cm mesh and approx. 5000 crossing areas to be welded, forces of approx. 1,000,000 N would be generated, which would make controllable welding quite impossible. Furthermore, it was assumed that, with vibrations of from 60 Hz to 300 Hz and given the large number of crossing areas to be welded simultaneously, the machine components would be destroyed.

However, surprisingly it has been found that, given a suitably heavy-duty design of the welding benches, it is possible for these forces to be tolerated, and consequently it is possible for, for example, from 500 to 8000 crossing areas to be welded simultaneously.

The essential factor allowing this improvement was the development, according to the invention, of a novel vibration-welding device equipped with a vibration plate which has a large surface area, corresponding foundations and corresponding control and pressure systems, and of bar supply arrangements. A plurality of these novel vibration-welding devices are set up next to one another and made to vibrate simultaneously under equal pressure conditions at identical amplitudes and frequencies. The amplitudes and frequencies are controlled in such a way that the amplitudes lie in the range from 0.5 mm to 2.5 mm, preferably from 1 mm to 2 mm, and the frequencies lie in the range from 60 to 300 Hz, preferably from 150 to 180 Hz.

Since a vibration-welding device according to the invention can be used to weld from 100 to 500 crossing areas, depending on the distance between the crossing areas and the width of the bars, which was hitherto inconceivable, the present invention has enabled large surface area geogrids to be produced in any desired widths, preferably in widths of from 3 to 6 m by setting up a corresponding number of vibration-welding units according to the invention next to one another.

The bars which are supplied in the longitudinal direction, i.e. in the direction of the machine, referred to below as longitudinal bars, are preferably supplied parallel to and at equal distances from one another. The bars which run transversely to the longitudinal direction, referred to below as transverse bars, are preferably laid at right angles to the longitudinal direction by being laid onto the longitudinal bars, with the longitudinal and transverse bars preferably forming square or more or less elongate, rectangular grid openings. Naturally, however, the transverse bars may also cross the parallel longitudinal bars at an angle of from 45° to 90°.

The distances between the longitudinal bars, on the one hand, and the transverse bars, on the other hand, may be selected as desired, and are preferably in the range from 10 mm to 100 mm, in particular in the range from 20 mm to 80 mm, in each case measured from side edge to side edge of the bars.

When producing the large surface area geogrids according to the invention, the procedure is such that the number of plastic bars arranged in the direction of the machine and the corresponding number of plastic bars in the direction transverse thereto are such that the overall width of the geogrid is from 3 m to 6 m preferably is 5 m, and the overall length is from 25 m to 50 m preferably from 50 m to 100 m.

The plastic bars which are used according to the invention are either square in cross section, preferably with side lengths of from 2.0 mm to 6.0 mm, in particular from 2.5 mm to 4.5 mm, or are rectangular in cross section, preferably having a width of from 5 mm to 40 mm, in particular of 10 mm, 12 mm or 16 mm, and a thickness of from 0.4 mm to 2.5 mm, in particular from 1.0 mm to 1.5 mm.

According to a particular embodiment, the longitudinal bars used are plastic bars which are wider and/or thicker than the transverse bars.

The thermoplastics which are preferably used include polyesters (PES), for example polyethylene terephthalate (PET), polyolefins, for example high-density polyethylene (HDPE) or polypropylene (PP), polyamides (PA), e.g. PA 6 and PA 66, aramid and polyvinyl alcohols (PVA).

In particular, the thermoplastics employed are polyethylene terephthalate (PET) or polypropylene (PP). To ensure that the tensile strength is as high as possible, the stretch ratio in the case of PP should be at most 1:15, preferably 1:9 to 1:13. In the case of PET, a maximum stretch ratio of 1:10, preferably 1:6 to 1:8, is appropriate, with which extensions of from 5% to 20% under the maximum tensile force can be achieved.

The strength of the plastic bars is preferably between 300 N/mm$^2$ and 800 N/mm$^2$, and they may be flexible or rigid.

Since the interaction between the reinforcement grid and earth is based on the activation of frictional forces between earth and grid, the grid bars may preferably be provided, on their top and/or bottom sides, with a profiling/stamping which increases the friction/contact with respect to the earth.

Possible stamped structures are, for example, diamond-shaped structures with a stamped depth of from 0.05 mm to 0.5 mm. However, the stamped depth should be between 0.5% and 30% of the thickness of the plastic bars. By way of example, the stamped depth may be 0.15 f per side if the plastic bar is 1.5 mm thick.

Examples of further possible stamped structures are
longitudinal grooves
transverse grooves
honeycomb structures
diamond-shaped structures with spikes
projections, spikes, etc.
or combinations of the above mentioned stamped structures.

The invention is explained further on the basis of the following data which is given by way of example without, however, constituting any limitation.

The plastic bars with a high tensile strength are extruded using an extruder of horizontal design with automatic melt filtration unit.

The plastic bars are stretched with a high tensile strength via a plurality of stretching stands, hot-air ducts and spray ducts with bar-diverter mechanisms, during which process molecular orientation takes place.

The extruded and stretched plastic bars are wound onto spools, for example up to a length of 15,000 linear metres, by means of winders.

In order for the plastic bars with a high tensile strength to be processed further so as to form large surface area geogrids with widths of preferably 3.0 m to 6.0 m in particular of 5.0 m the spools produced are laid on spool racks. The receiving apparatuses for the individual spools preferably contain a braking device, in order to ensure that the spools are unwound in a controlled manner. For a working width of 5.0 m and an assumed distance from the centre of one plastic bar to the centre of the next plastic bar of 30 mm, using plastic bars with a width of 10 mm, 167 receiving apparatuses would be required.

However, as mentioned above, it is also possible to select other distances in the range from 10 mm to 100 mm, since, for example for drain mats, the distances are preferably reduced to as little as approx. 10 mm and below, in order to ensure pressure-stable outlet conditions in the drainage structure.

As has also already been mentioned, all the plastic bars which are to be laid in the longitudinal direction are preferably positioned parallel to one another.

The plastic bars which run in the longitudinal direction (direction of the machine) (longitudinal bars) are taken off by means of a take-off unit. The take-off unit contains a transverse cutting system for separating the longitudinal bars when changing reel and a joining device for automatically joining the new longitudinal bars to the remainder of the old longitudinal bars. Ultrasonic welding devices or vibration-welding devices are preferably used for this joining operation.

Pneumatically actuated brakes ensure that the individual longitudinal bars are pulled into the take-off unit in a controlled manner. The take-off unit is designed in such a way that a continuous stress in the individual longitudinal bars is ensured during the subsequent welding operation.

The plastic bars which run transversely to the longitudinal bars (transverse bars) are laid by means of a laying head. Preferably, up to 50 transverse bars can be laid simultaneously. The laying head is designed in such a way that it is possible to lay the up to 50 transverse bars preferably in both directions when it passes over the longitudinal bars.

During the laying operation, individual brakes ensure that the stress in the individual transverse bars remains constant.

The laid transverse bars are supplied by means of a caterpillar pull-on or pull-off of the individual welding unit for the grid crossing areas. The caterpillar pull-on comprises in each case a bottom, stationary duplex chain and two horizontally movable duplex chains. To ensure that there is sufficient pressure between the two duplex chains to stress the transverse bars, there is a pressure hose beneath the bottom chain guide, which presses the bottom caterpillar chain against the top caterpillar chain.

Concomitantly moving cutting devices cut through the laid, stressed transverse bars just before they are conveyed into the welding device.

The vibration-welding apparatus comprises, for example, 10 vibration devices which are arranged next to one another and each have a large vibration plate with integrated vibration frame, drive generators, amplitude-control circuit board and vibration-limiting device. The dimensions of the individual vibration devices are, for example, 475 mm×720 mm, so that all 10 vibration devices together allow, for example, from approx. 4000 to approx. 8000 individual welds to be carried out in a single operation. The welding operation preferably takes place in a range between 60 and 300 Hz, in particular between 150 and 180 Hz, and at amplitudes of up to 2 mm.

The 10 vibration devices each have a complete machine frame. The 10 corresponding bottom tools are positioned on 10 welding benches which, in order for welding to be carried out, are raised by means of in each case 4 hydraulic cylinders. Separating combs are used in the area of the welding tools in order to guide the plastic bars.

After the welding operation, the finished large surface area geogrid can be supplied to a lamination station, for example for nonwoven, woven or knitted fabrics or sheets, via a principal take-off unit, in order for composite products, for example comprising grid and nonwoven, to be produced for use as a plastic drain element or as a separating and reinforcement element, in an operation which immediately follows the production of the geogrid. The lamination on one or both sides may be carried out by means of a heated tool, hot air, adhesive, etc. Following the lamination, the composite products are fed to the cutting and winding unit.

The geogrids according to the invention which have been laminated to sheets are eminently suitable for tarpaulins for freight and lorries, and for temporary roofs.

In addition to their principal application areas mentioned in the introduction, the geogrids according to the invention themselves may also be used to construct fences, for example as animal protection fences, or to construct fences used in animal rearing, or to construct fences to secure construction sites, as avalanche protection or as protection against falling rocks.

The invention claimed is:

1. A vibration-welding apparatus using the friction welding technique for a continuous production of geogrids having thermoplastic bars which cross one another forming a multiplicity of crossing areas arranged next to and behind one another which are intermittently welded simultaneously, wherein the vibration-welding apparatus includes
    a take off unit for taking off longitudinal bars;
        a laying head for furnishing of transverse bars running transversely relative to the longitudinal bars;
        a plurality of vibration-welding devices, which are set up next to one another
        each vibration welding device is equipped with
            a corresponding control and pressure system;
            a vibration plate, which has a large surface area and which is used to weld at least 100 crossing areas simultaneously;
            a bottom tool, which is positioned on a welding bench and which, in order for welding to be carried out, is raised by means of 4 hydraulic cylinders;
            a separating comb, which is used in the area of the welding tool in order to guide the plastic bars;
            wherein all vibration welding devices are made to vibrate simultaneously under equal pressures and amplitudes and frequencies.

2. The vibration-welding apparatus according to claim 1, wherein a corresponding number of vibration-welding devices set up next to one another depending on a desired width of the geogrid,
wherein in each case from 100 to 500 crossing areas can be welded simultaneously with one of said vibration-welding devices.

3. The vibration-welding apparatus according to claim 1, wherein a plurality of vibration-welding devices are induced to vibrate simultaneously at equal pressures and amplitudes and frequencies, and
wherein the amplitudes are disposed in a range from about 0.5 mm to 2.5 mm and
wherein the frequencies are disposed in a range from about 60 to 300 Hz.

4. A vibration-welding apparatus using the friction welding technique for a continuous production of geogrids having thermoplastic bars which cross one another forming a multiplicity of crossing areas arranged next to and behind one another which are intermittently welded simultaneously,
wherein the vibration-welding apparatus includes a plurality of vibration-welding devices, each equipped with a vibration plate, which vibration plate has a large surface area and which vibration plate is used to weld at least 100 crossing areas simultaneously, and
wherein a corresponding number of vibration-welding devices are set up next to one another depending on a desired width of the geogrid, and
wherein in each case from 100 to 500 crossing areas can be welded simultaneously with one of said vibration-welding devices, and
wherein said vibration-welding devices are made to vibrate simultaneously at equal pressures and amplitudes and frequencies, and
wherein the amplitudes are disposed in a range from about 0.5 mm to 2.5 mm and
wherein the frequencies are disposed in a range from about 60 to 300 HZ,
further comprising
    a take off unit for taking off longitudinal bars;
    a laying head for furnishing of transverse bars running transversely relative to the longitudinal bars.

5. A vibration-welding apparatus using the friction welding technique for a continuous production of geogrids having thermoplastic bars which cross one another forming a multiplicity of crossing areas arranged next to and behind one another which are intermittently welded simultaneously,
  wherein the vibration-welding apparatus includes a plurality of vibration-welding devices, each equipped with a vibration plate, which vibration plate has a large surface area and which vibration plate is used to weld at least 100 crossing areas simultaneously, and
  wherein a corresponding number of vibration-welding devices are set up next to one another depending on a desired width of the geogrid, and
  wherein in each case from 100 to 500 crossing areas can be welded simultaneously with one of said vibration-welding devices, and
  wherein said vibration-welding devices are made to vibrate simultaneously at equal pressures and amplitudes and frequencies, and
  wherein the amplitudes are disposed in a range from about 0.5 mm to 2.5 mm and
  wherein the frequencies are disposed in a range from about 60 to 300 Hz,
further comprising
  a take-off unit for supplying the longitudinal bars;
  a laying head for furnishing of transverse bars running transversely relative to the longitudinal bars;
  separating combs, which are used in the area of the welding tools in order to guide the plastic bars.

6. A vibration-welding apparatus using the friction welding technique for a continuous production of geogrids having thermoplastic bars which cross one another forming a multiplicity of crossing areas arranged next to and behind one another which are intermittently welded simultaneously,
  wherein the vibration-welding apparatus includes a plurality of vibration-welding devices, each equipped with a vibration plate, which vibration plate has a large surface area and which vibration plate is used to weld at least 100 crossing areas simultaneously, and
  wherein a corresponding number of vibration-welding devices are set up next to one another depending on a desired width of the geogrid, and
  wherein in each case from 100 to 500 crossing areas can be welded simultaneously with one of said vibration-welding devices, and
  wherein said vibration-welding devices are made to vibrate simultaneously at equal pressures and amplitudes and frequencies, and
  wherein the amplitudes are disposed in a range from about 0.5 mm to 2.5 mm and
  wherein the frequencies are disposed in a range from about 60 to 300 Hz,
further comprising
  an extruder of horizontal design with automatic melt filtration unit for extruding plastic longitudinal bars or plastic transverse bars;
  a plurality of stretching stands, hot air ducts, and spray ducts with bar diverter mechanisms for stretching the plastic bars with a high tensile strength, wherein molecular orientation takes place in the plastic bars;
  winders for winding the extruded and stretched plastic bars onto spools;
  receiving apparatus for individual spools;
  a braking device associated with the receiving apparatus for ensuring that the individual spools are unwound in a controlled manner;
  a laying head forming part of the bar supply arrangements.

7. A vibration-welding apparatus using the friction welding technique for a continuous production of geogrids having thermoplastic bars which cross one another forming a multiplicity of crossing areas arranged next to and behind one another which are intermittently welded simultaneously,
  wherein the vibration-welding apparatus includes a plurality of vibration-welding devices, each equipped with a vibration plate, which vibration plate has a large surface area and which vibration plate is used to weld at least 100 crossing areas simultaneously, and
  wherein a corresponding number of vibration-welding devices are set up next to one another depending on a desired width of the geo grid, and
  wherein in each case from 100 to 500 crossing areas can be welded simultaneously with one of said vibration-welding devices, and
  wherein said vibration-welding devices are made to vibrate simultaneously at equal pressures and amplitudes and frequencies, and
  wherein the amplitudes are disposed in a range from about 0.5 mm to 2.5 mm and
  wherein the frequencies are disposed in a range from about 60 to 300 Hz,
further comprising
  a take-off unit for taking off the plastic longitudinal bars which run in the longitudinal direction of the machine by means of a take-off unit and for ensuring a continuous stress in the individual longitudinal bars during friction welding;
  a transverse cutting system contained in the take-off unit for separating the longitudinal bars when changing reels;
  a joining device for automatically joining the longitudinal bars of the changed reel to the remainder of the previously processed longitudinal bars, wherein the joining device comprises an ultrasonic welding device or a friction-welding device for this joining operation
  a laying head forming part of the bar supply arrangements and wherein the longitudinal bars are made of plastic wherein the laying head places up to 50 of transverse bars predetermined by the grid measure above a predetermined number of longitudinal bars; and wherein all the plastic longitudinal bars which are to be laid in the longitudinal direction are preferably positioned parallel to one another.

8. A vibration-welding apparatus using the friction welding technique for a continuous production of geogrids having thermoplastic bars which cross one another forming a multiplicity of crossing areas arranged next to and behind one another which are intermittently welded simultaneously,
  wherein the vibration-welding apparatus includes a plurality of vibration-welding devices, each equipped with a vibration plate, which vibration plate has a large surface area and which vibration plate is used to weld at least 100 crossing areas simultaneously, and
  wherein a corresponding number of vibration-welding devices are set up next to one another depending on a desired width of the geogrid, and
  wherein in each case from 100 to 500 crossing areas can be welded simultaneously with one of said vibration-welding devices, and
  wherein said vibration-welding devices are made to vibrate simultaneously at equal pressures and amplitudes and frequencies, and
  wherein the amplitudes are disposed in a range from about 0.5 mm to 2.5 mm and
  wherein the frequencies are disposed in a range from about 60 to 300 Hz, further comprising
individual brakes for ensuring that the stress in the individual transverse bars remains constant during a laying operation;
a caterpillar pull-on or pull-off of the individual friction welding unit for supplying transverse bars to be laid for forming grid crossing areas, wherein the caterpillar pull-on comprises in each case a bottom, a stationary duplex chain with a bottom chain guide and an upper horizontally movable duplex chain;
a pressure hose disposed beneath the bottom chain guide, which presses the bottom duplex chain against the top duplex chain for ensuring that concomitantly moving cutting devices cut through the laid, stressed transverse bars just before they are conveyed into the welding device.

9. A vibration-welding apparatus using the friction welding technique for a continuous production of geogrids having thermoplastic bars which cross one another forming a multiplicity of crossing areas arranged next to and behind one another which are intermittently welded simultaneously,
wherein the vibration-welding apparatus includes a plurality of vibration-welding devices, each equipped with a vibration plate, which vibration plate has a large surface area and which vibration plate is used to weld at least 100 crossing areas simultaneously, and
wherein a corresponding number of vibration-welding devices are set up next to one another depending on a desired width of the geogrid, and
wherein in each case from 100 to 500 crossing areas can be welded simultaneously with one of said vibration-welding devices, and
wherein said vibration-welding devices are made to vibrate simultaneously at equal pressures and amplitudes and frequencies, and
wherein the amplitudes are disposed in a range from about 0.5 mm to 2.5 mm and
wherein the frequencies are disposed in a range from about 60 to 300 Hz,
wherein the vibration-welding apparatus comprises 10 vibration plates which are arranged next to one another and each is associated with an integrated vibration frame, drive generators, an amplitude-control circuit board and a vibration-limiting device;
wherein the 10 vibration plates each are associated with a complete machine frame;
wherein 10 bottom tools corresponding to the 10 vibration plates are positioned on 10 respective welding benches which, in order for welding to be carried out, are raised by means of in each case 4 hydraulic cylinders; and
wherein separating combs are disposed in the area of the 10 bottom tools for guiding the plastic bars.

10. A vibration-welding apparatus using the friction welding technique for a continuous production of geogrids having thermoplastic bars which cross one another forming a multiplicity of crossing areas arranged next to and behind one another which are intermittently welded simultaneously,
wherein the vibration-welding apparatus includes a plurality of vibration-welding devices, each equipped with a vibration plate, which vibration plate has a large surface area and which vibration plate is used to weld at least 100 crossing areas simultaneously, and
wherein a corresponding number of vibration-welding devices are set up next to one another depending on a desired width of the geogrid, and
wherein in each case from 100 to 500 crossing areas can be welded simultaneously with one of said vibration-welding devices, and
wherein said vibration-welding devices are made to vibrate simultaneously at equal pressures and amplitudes and frequencies, and
wherein the amplitudes are disposed in a range from about 0.5 mm to 2.5 mm and
wherein the frequencies are disposed in a range from about 60 to 300 Hz,
further comprising
a plurality of vibration drive generators connected to respective ones of the plurality of vibration plates,
wherein the transverse bars resting on the longitudinal bars are placed in direct contact with the longitudinal bars in their respective cross regions and
wherein these areas are heated by vibrating the transverse bars and the longitudinal bars against each other under pressure by friction and wherein said bars are in part molten at their respective overlapping contact surfaces of the cross regions and are thereby friction welded to each other.

* * * * *